United States Patent [19]

July

[11] 4,337,388
[45] Jun. 29, 1982

[54] RAPID-RESPONSE WATER HEATING AND DELIVERY SYSTEM

[76] Inventor: Mark E. July, 2118 Carol, Ann Arbor, Mich. 48103

[21] Appl. No.: 154,508

[22] Filed: May 29, 1980

[51] Int. Cl.³ .............................................. H05B 1/02
[52] U.S. Cl. .................................. 219/309; 219/497; 219/494; 219/308; 219/328; 237/8 A; 237/2 A; 236/46 F
[58] Field of Search .............. 219/506, 501, 497, 494, 219/496, 307, 308, 309, 331, 330; 237/2 R, 2 A, 8 R, 8 A; 307/117; 236/46 F

[56] References Cited

U.S. PATENT DOCUMENTS

| | | | |
|---|---|---|---|
| 3,099,737 | 7/1963 | Naxon | 219/309 |
| 3,465,123 | 9/1969 | Harris | 219/331 X |
| 3,826,887 | 7/1974 | Pemberton | 219/501 |
| 3,904,849 | 9/1975 | Lucero et al. | 219/331 |
| 3,952,182 | 4/1976 | Flanders | 219/309 |
| 4,139,761 | 2/1979 | Obrowski | 219/308 |
| 4,167,663 | 9/1979 | Granzow, Jr. et al. | 219/494 |

*Primary Examiner*—B. A. Reynolds
*Assistant Examiner*—M. Paschall
*Attorney, Agent, or Firm*—Olsen and Stephenson

[57] ABSTRACT

A rapid-response water heating and delivery system for quickly and accurately heating water to a selected set point temperature within a predetermined temperature range, and for maintaining the selected set point temperature of the water for a wide range of volumetric flow rates and for a wide range of initial water temperatures. The heating and delivery system includes a water vessel containing electrical heating elements for heating the water flowing through the vessel and a control unit automatically operable to control the supply of electrical energy to the electrical heating elements, taking into account the actual temperature of the water being discharged from the vessel, the selected set point temperature called for, and the rate at which the actual temperature of the water being discharged from the vessel changes with respect to the selected set point temperature so that the temperature of the water flowing through the vessel quickly approaches the selected set point temperature.

4 Claims, 3 Drawing Figures

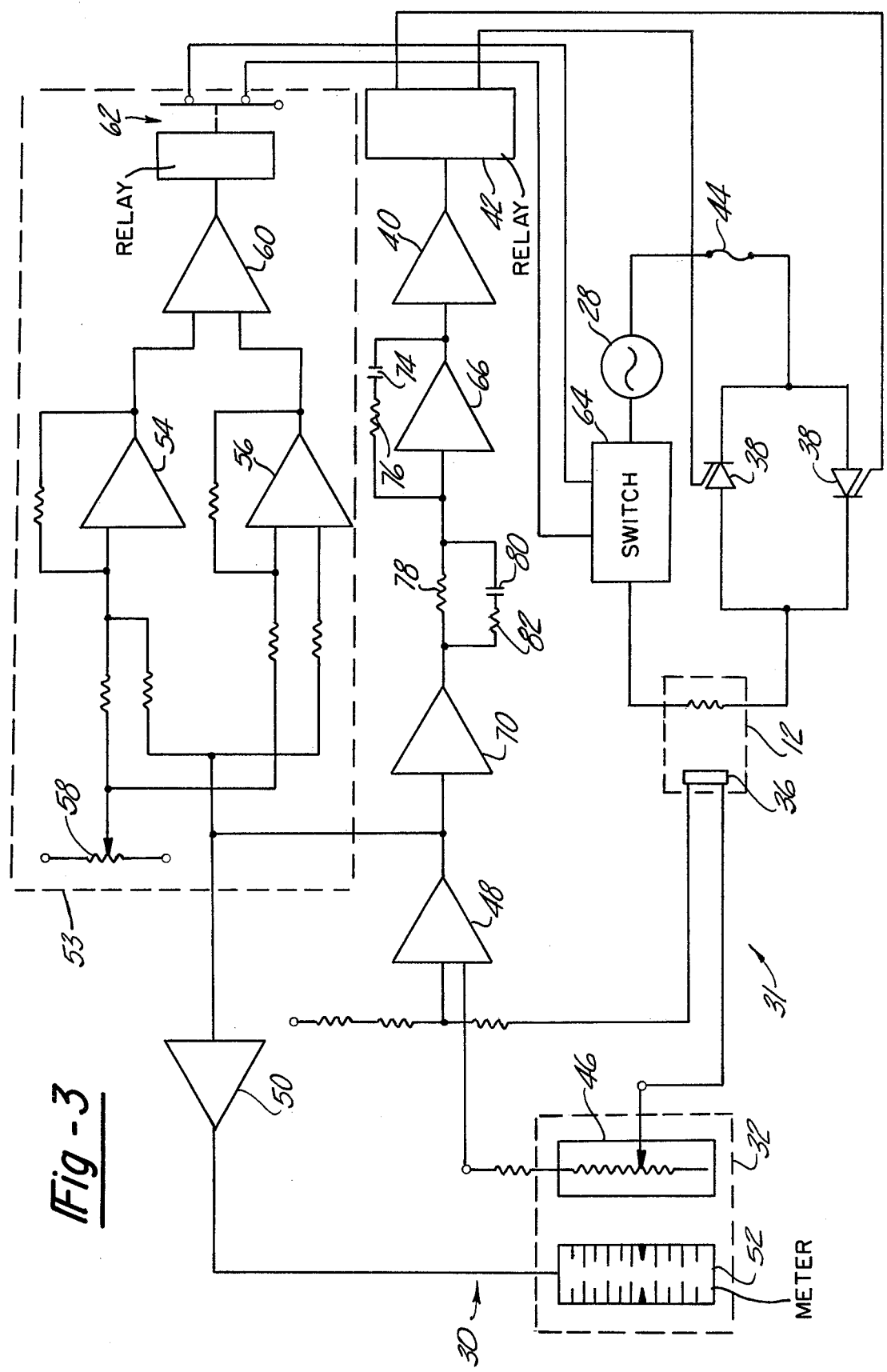

RAPID-RESPONSE WATER HEATING AND DELIVERY SYSTEM

BACKGROUND OF THE INVENTION

The present invention relates generally to instantaneous water heaters, and more particularly, to an improved control system in a water heating and delivery system which enables the quick and accurate heating of water to a selected set point temperature.

Instantaneous hot water heaters adapted to service one or more water outlet taps are well known, as shown in U.S. Pat. Nos. 3,099,737 and 3,952,182. The instantaneous water heaters disclosed in these patents, although adequate, fail to provide optimum user control to insure that the temperature of the water being discharged from the tap corresponds to the demand set point temperature established in the control system. Such precision is especially important for those people who are insensitive to temperature. An excessively high water temperature may damage skin tissue of a person afflicted with such a condition, and yet, the person exposed to such hot water will have no sensation of pain.

Most instantaneous hot water heaters employ on and off switching controls which operate in either a full "on" mode or a full "off" mode, depending upon the sensed temperature of the water being discharged with respect to the selected set point temperature at which the water is to be discharged. When the temperature of the water being discharged is below the set point temperature value, full power is applied to the heating elements, and when the temperature of the water is above the desired set point temperature, there is a complete absence of power being supplied to the electrical heating elements. Because most instantaneous hot water heaters have little or no storage capacity, "on" and "off" switching controls tend to cause the temperature of the water being discharged from the vessel to oscillate above and below the desired set point temperature. Consequently, the temperature of the water being discharged can vary over a wide and possibly unacceptable range. Should the temperature of the water overshoot the set point temperature by a sufficient amount, the user may be exposed to excessively hot water.

It is the general object of this invention, therefore, to provide an improved water heating and delivery system for quickly and accurately heating water to a desired set point temperature.

It is another object of the present invention to provide a water heating and delivery system equipped with an improved control system for regulating the temperature of the water being discharged.

SUMMARY OF THE INVENTION

The rapid-response water heating and delivery system of this invention provides for the quick and accurate heating of water to a selected set point temperature within a predetermined temperature range. The water heating and delivery system consists of a water vessel having an outlet and an inlet arranged so that water flowing through the vessel enters the inlet and is discharged from the outlet. Electrical heating means, in the form of heating elements, is disposed in the vessel so as to heat the water flowing through the vessel. The heating elements are connected to a source of electrical energy and are controlled by an anticipatory control system which causes the water to be quickly and accurately heated to a selected set point temperature and which operates automatically to maintain the set point temperature of the discharging water regardless of the volumetric flow rate of the water or its initial temperature. The control system of this invention cycles power on and off in essentially a stepless manner to the electrical heating elements taking into account the selected set point temperature inputted into the control system, the actual sensed temperature of the water being discharged from the vessel, and the rate at which the actual temperature of the discharging water changes with respect to the selected set point temperature so that the temperature of the water being discharged is heated quickly to the selected set point temperature. The control system of this invention anticipates the direction in which the temperature is changing and automatically accounts for the time lags that result between application or removal of electrical power, and the actual change of the water temperature being discharged. The control system serves to inhibit the overshooting or undershooting of the temperature of the discharging water with respect to the established set point temperature so that the temperature of the water is maintained substantially at the set point temperature.

The present invention is especially useful for those people who are insensitive to temperature variations. The controller includes a regulator unit which can be installed in a shower accessible to the user or near the hot water tap so that the selected set point temperature can be set on the regulator and the user can be confident that the temperature of the water being discharged from the tap accurately corresponds to the selected set point temperature. This invention, therefore, minimizes the likelihood that a person can unknowingly be burned by hot water.

Further objects, features and advantages of the present invention will become apparent from a consideration of the following description, the appended claims and the accompanying drawing, in which:

FIG. 3 is a schematic diagram of the circuitry of the control system of the present invention for controlling the heating of water.

Figure 1:
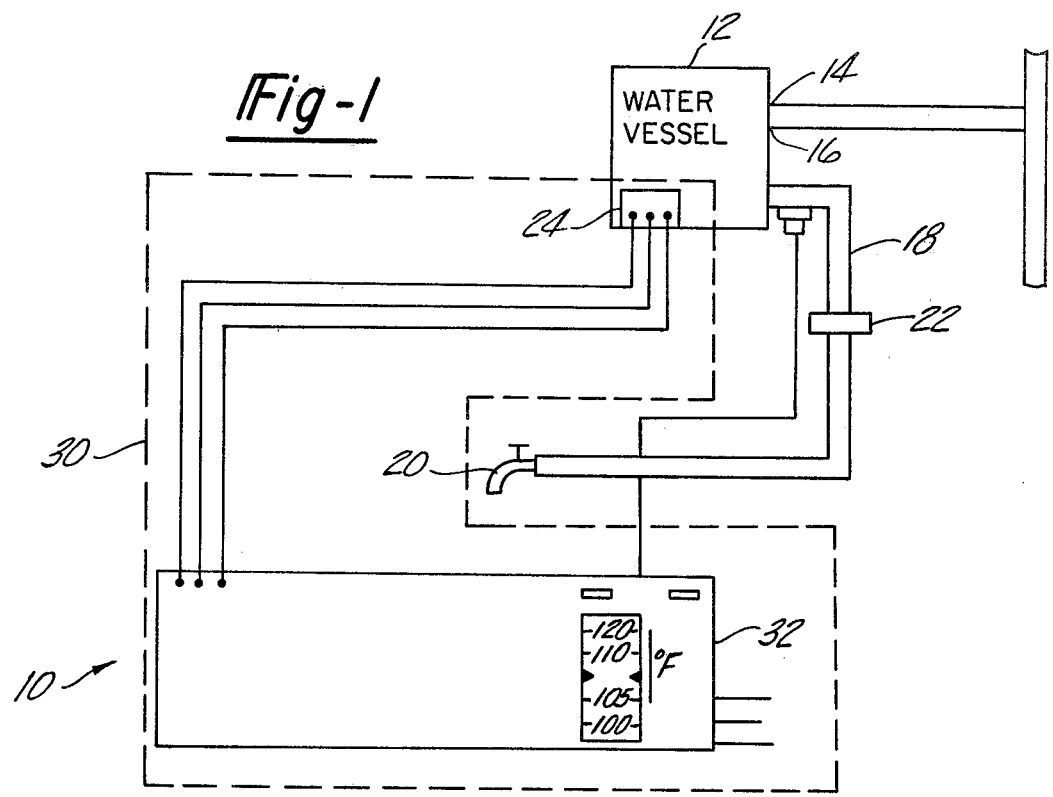
FIG. 1 is a schematic diagram of the water heating and delivery system of the present invention.

Referring to the drawing, the water heating and delivery system of this invention, indicated generally at 10, is shown in FIG. 1 consisting of a water vessel 12 having a cold water inlet 14 and a hot water outlet 16 arranged with respect to the inlet 14 so that water flows through the vessel from the inlet 14 to the outlet 16. A pipe 18 connects the outlet 16 with a faucet 20 located at a sink or a shower, for example. A pressure-relief valve 22 is disposed in the pipe 18 to ensure that the pressure of the water flowing through the pipe 18 does not rise above a predetermined pressure value.

Figure 2:
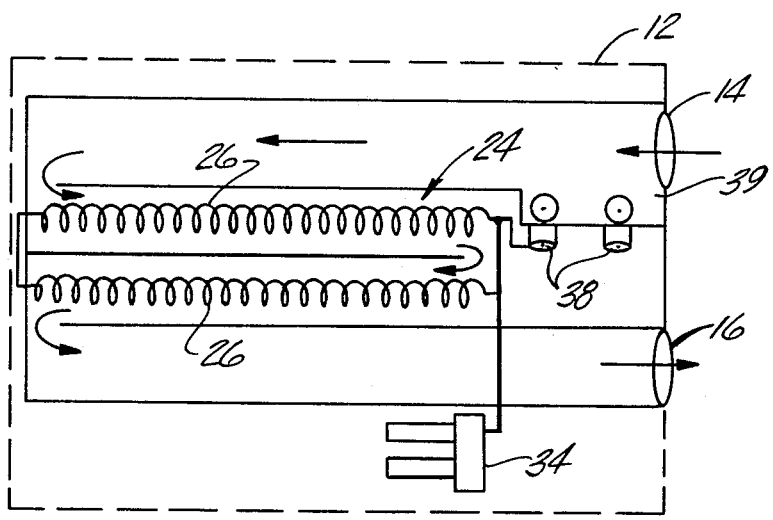
FIG. 2 is a fragmentary diagrammatic view of a portion of the hot water heater of the present invention.

The water vessel 12 houses electrical heating means 24 in the form of heating elements 26, as shown in FIG. 2, which heat the water as it flows in the direction of the arrows from the inlet 14 toward the outlet 16. The heating elements 26 are connected to an AC voltage source 28 (FIG. 3) and receive power in a stepless cyclical on and off manner to quickly and accurately heat the water flowing through the vessel 12 to a selected set point temperature within a predetermined temperature range. The water heating and delivery system 10 also includes an automatic anticipatory control system 30 including a regulator 32 which is actuatable by the user to establish the selected set point temperature, and a thermocouple 36 positioned to sense the temperature of the water being discharged from the outlet 16 of the water vessel 12. As seen in FIG. 2, a pressure-sensitive switch 34, is positioned in the vessel 12 to connect the AC source 28 to the heating elements 26 by way of the controller 30 when water begins to flow through the vessel 12.

The control system 30 produces an anticipatory action for controlling the temperature of the water flowing through the vessel 12. It establishes a predetermined temperature range, or proportional bank, around the selected set point temperature. Application of power to the heating elements 26 occurs automatically without the temperature changing, provided the temperature is within the preset temperature range. There is a relationship between the actual temperature of the water within the proportional band and the average power supplied to the elements 26.

If the set point temperature is positioned in the middle of the proportional band, or predetermined temperature range, and the actual temperature of the water being discharged from the vessel 12 is within the temperature range but below the set point temperature value, a greater average power then would be supplied to the heating elements 26 to move the actual temperature toward the set point value. As the actual temperature increases, the average power supplied to the heating elements 26 would correspondingly decrease so that the actual temperature of the water being discharged would be restrained from overshooting the set point value by an appreciable amount. When the actual temperature is below the set point value, and just within the boundaries of the predetermined temperature range, full power will be supplied to the heating elements 26. Of course, full power would be applied if the actual temperature were out of the proportional band below the set point value. As the actual temperature rises, a corresponding decrease of average power will be applied to the heating elements 26. If the actual temperature of the water is above the selected set point temperature, the control system 30 will control the supply of electrical energy to the heating elements 26 in a manner to cause the actual temperature to drop without undershooting the set point temperature. The control system 30, therefore, automatically causes the actual temperature of the discharging water to be maintained at the set point value once it has been heated to that level.

The control system 30 employs a derivative or rate action which takes into account the speed at which the actual temperature of the water being dicharged from the vessel 12 changes with respect to the set point temperature and modifies the average power supplied to the heating elements 26 to minimize the likelihood that the actual temperature will overshoot or undershoot the set point temperature. The control system 30, in essence, monitors the speed at which the temperature is changing and then cycles power on and off to the heating elements 26 in a manner to prevent an overshooting or undershooting of the temperature with respect to the set point temperature. Essentially, the derivative action of the control system 30 automatically expands and retracts the width of the proportional band so that as the temperature rapidly approaches the set point value established on the regulator 32, the band will be narrowed so that control can be maintained of the actual temperature within the predetermined temperature range. In other words, derivative action operates by expanding and retracting the proportional band in a specific direction to control the amount of electrical power supplied to the heating elements 26.

The control system 30 further includes a reset control or integral function which operates to move the proportional band, or predetermined temperature range, up or down with respect to the selected set point temperature. It has been determined that optimum band movement occurs every 6.7 seconds in order to steady the actual temperature at the set point. This movement causes power to be supplied to the heating elements 26 in a manner that will cause the actual temperature of the water being discharged from the vessel 12 to be maintained at the established set point value. The integral action is a fine-tuning control to ensure that the actual temperature of the water being discharged from the vessel is substantially at the set point value with oscillation about the selected set point being held to a minimum.

Referring to FIG. 3, a more detailed illustration of the water and delivery system 10 and the control circuit 31 is provided. The water vessel 12, shown in broken lines, houses the heating elements 26. The thermocouple 36 which has a sensor in intimate contact with the water flowing through the vessel 12 provides a reference voltage proportional to the temperature of the water being discharged from the vessel 12. A pair of thyristors 38, arranged in opposite directions, and mounted on a heat sink 39 on the cold water inlet 14 (FIG. 2), provide full-wave power control so that power can be supplied to the heating elements 26 regardless of the instantaneous direction of the AC source. The thyristors 38 are triggered by a power amplifier 40 through a relay system 42.

Thyristors are transistor-like devices which are insulators until they are triggered by an appropriate voltage signal. They are then good conductors and can pass high currents with only a small voltage drop. Once the current through a conducting thyristor 38 drops to zero, which it does every half cycle with an alternating current supply, it ceases to conduct until further triggered. Each thyristor 38 will only conduct in one direction and thus the pair is needed to control an alternating supply bidirectionally. The thyristors 38 can be triggered in what is known as phase-angle firing. They are switched on and off at predetermined positions within each half cycle. Thus, the average mean power supply to the heating elements 36 is controlled depending on where within AC current cycle the thyristors 38 are triggered. A fast blow fuse 44 is located between the power supply 28 and the heating elements 26 and provides immediate shut-off of power to the heating elements 26 if the current rises above a predetermined level.

The regulator 32 includes a potentiometer 46 which is controllable by the user to establish a selected set point temperature. The potentiometer 46 establishes a reference voltage that is supplied to an error amplifier 48 which is a high-gain, low-drift DC amplifier. The thermal couple 36 provides an input voltage signal to the error amplifier 48 that is proportional to the temperature of the water being discharged from the vessel 12. The error amplifier 48 generates a signal that is proportional to the difference between the selected set point temperature inputted on the controller 32 by way of the potentiometer 46 and the actual temperature sensed by the thermocouple 36. The output of the error amplifier 48 is transmitted to a meter-follow amplifier 50 which controls a meter 52 to provide a visual indication of the actual temperature of the water being discharged from the vessel 12. The error signal generated by the amplifier 48 is also supplied to an alarm system 53 comprised of amplifiers 54 and 56 which also receive an alarm reference voltage from a potentiometer 58. Should the error signal from the amplifier 48 when compared to the reference voltage from the alarm potentiometer 58 indicate that the temperature of the water exceeds a predetermined safe value, an amplifier 60 will be activated to control a relay 62 to open a switch 64 cutting off power to the heating elements 26.

The error signal from the error amplifier is further supplied to a three-term amplifier 66 which controls the power amplifier 40 to fire the thyristors 38 in a cyclical on and off manner to provide the proper amount of average electrical energy to the heating elements 26. The three-term amplifier 66 provides proportional, derivative, and integral control to the thyristors 38. Proportional control or the establishment of a desired predetermined temperature range is affected by a proportional bank amplifier 70.

Integral action is achieved by placing a capacitor 74 across the amplifier 66 and in series with a resistor 76. When the output of the error amplifier 48 is positive corresponding to a temperature below a selected set point temperature, current flows through an input resistor 78 due to the potential difference across it. The output of the three-term amplifier 66 becomes negative such that all of the input current in resistor 78 flows through resistor 76. The negative movement of the output of the amplifier 66 causes its output power to increase in proportion to the error signal provided by the error amplifier 48. The input current through resistor 78 and resistor 76 causes the capacitor 74 to charge in a direction which produces, in addition, a negative ramp at the output of the amplifier 66. The amplifier output automatically adjusts to balance the currents in resistors 76 and 78. The negative ramp at the amplifier output of the amplifier 66 causes a further gradual increase in output power. As the output power of the amplifier 66 increases, the temperature of the water rises and the error signal provided by the amplifier 48 reduces. When the temperature of the water attains the set point temperature, the input signal of the error amplifier 48 falls to zero, and the capacitor 74 ceases to charge. Capacitor 74 will always acquire sufficient charge to enable the required output power to be maintained with a zero-volt signal, representing zero error from the error amplifier 48.

The derivative action of the three-term amplifier 66 is achieved by placing a derivative-action capacitor 80 and a resistor 82 in series across the input resistor 78. When the temperature is changing, the derivative capacitor 80 presents a low impedance which shunts the input resistor 78 and increases the gain of the amplifier 66. With rapid input changes, the derivative capacitor 80 presents a short circuit, and the output of the amplifier 66 is increased by a factor determined by dividing the value of resistor 76 by the value of the resistor 78 to approximately the value of resistor 76 divided by the value of resistor 82, assuming that resistor 82 has a much lower resistance than the input resistor 78. The gain of the amplifier 66 increases as the rate of change of temperature increases, and the corresponding rapid change of output power acts in a direction which will reduce the rate of change of temperature. When the temperature of the water is steady, the derivative action dies away as the derivative capacitor 80 recharges through the resistors 78 and 82. Consequently, the power amplifier 40 is controlled in a manner dependent upon the actual temperature of the water being discharged from the vessel 12, the set temperature established by a selected positioning of the potentiometer 46, and the rate at which the temperature of the water discharging from the vessel 12 is changing with respect to the set point temperature.

The control system 30 having the control circuit 31 employing the three-term amplifier 66 along with its integral and derivative functions established by the capacitor and resistor networks 70, 78, 74, 76, 80, and 82 quickly provides power to the heating elements 26 to change the temperature of the water in a direction to expeditiously attain the set point value. The control system 30 automatically anticipates the direction in which the temperature is moving to accordingly provide the proper amount of power to the heating elements 26. The controller used in this invention is essentially similar to the Eurotherm controller manufactured by Eurotherm Corporation, having offices in Isaac Newton Center, Reston, Virginia.

Prior to opening the faucet 20, the user would activate the regulator 32 by adjusting the potentiometer 46 to establish the selected set point temperature. Opening the faucet 20 will allow water to flow through the vessel 12 which activates the pressure-sensitive switch 34 to connect the AC source 28 to the heating elements 26 by way of the controller 30.

Assume that the temperature of the water initially discharging from the vessel 12 is below the set point value. The thermocouple 36 would generate a voltage signal that would be applied to the error amplifier 48 and that would be compared to the reference signal voltage from the potentiometer 46. In this case, the error signal would indicate a request for heat. The error signal applied to the error amplifier 48 is at the microvolt level and is amplified to drive the meter amplifier 50 and the proportional band amplifier 70 which in turn drives the three-term amplifier 66. When the error signal enters the proportional band amplifier 70, there is an immediate call for 100% power to the heating elements 26 since the actual temperature is substantially below the set point value and out of proportional band. The derivative action increases the gain of the proportional amplifier 70 to increase the width of the proportional band. As the temperature of the water rises, it will enter the proportional band and it then will be proportionally controlled. The average power supplied to the heating elements 26 will decrease as the water temperature approaches the set point value, taking into account the rate at which the actual temperature is changing. If the actual temperature should overshoot the set point value, it still will be within the proportional band and the controller 30 will automatically operate to cause the temperature to fall toward the set point value.

When the actual temperature of the water discharging from the vessel 12 oscillates around the set point, the integral function circuit network will adjust the gain of the proportional amplifier 70 to move the proportional band in a direction to keep the temperature of the discharging water at the selected set point value. In this manner, the set point temperature of the discharging water is quickly attained and it is maintained at that level with minimum deviation by virtue of the operation of the anticipatory controller 30.

From the above description, it can be seen that an improved water heating and delivery system 10 is provided that enables people who are insensitive to temperature changes to accurately control the temperature of the hot water for showering or washing. The instantaneous hot water heater of the present invention, employs a control system which takes into account the actual temperature of the water being discharged, the desired temperature inputted, and the rate at which the temperature changes with respect to the set point temperature. Consequently, temperature of the water is quickly and accurately established.

What is claimed:

1. A rapid-response water heating and delivery system for quickly heating water to a selected set point temperature within a predetermined temperature range and for providing a perceivable measure of the temperature of the water issuing therefrom, said delivery system comprising a water vessel having a water inlet and a water outlet positioned such that incoming water flows through said vessel from said inlet to said outlet and means for dispensing water from said outlet onto a person using the system, electrical heating means connected to a source of electrical energy and located in said vessel in a position for heating the water as it flows through said vessel, control means for controlling electrical energy supplied to said electrical heating means such that said water being discharged from said vessel has a temperature value essentially equal to said selected set point temperature, said control means including regulating means comprising a temperature setting device actuatable over a range of temperature to establish said selected set point temperature, said regulating means including temperature indicating means positioned with respect to said water outlet so as to provide the user of said system a perceivable measure of the temperature of the water being discharged from said outlet, a single temperature sensor disposed at the water outlet of the vessel for sensing the temperature of the water being discharged from said vessel, and demand-responsive means operatively associated with said temperature sensor and said regulating means and automatically operable to control said electrical heating means taking into account said selected set point temperature of the temperature setting device in said regulating means, the actual temperature of the water being discharged from said vessel, and the rate at whichd the temperature of the water being discharged from said vessel changes with respect to said set point temperature so that the temperature of the water flowing through said vessel quickly approaches said selected set point temperature, said demand responsive means comprising a proportional integral and derivative controller which automatically cycles said electrical heating means on and off when the temperature of the water being discharged from said vessel is within said predetermined range to offset the heat losses from said vessel including the heat losses resulting from the discharge of heated water, said proportional, integral and derivative controller comprising means connecting said temperature setting device and said temperature sensor in an input circuit of an amplifier stage, means connecting the output of the amplifier stage with both said temperature indicating means and a further portion of said proportional, integral and derivative controller such that the output signal of said amplifier stage controls both the temperature indicating means and said further portion of the proportional, integral and derivative controller, said further portion of the proportional, integral and derivative controller comprising an RC derivative circuit connecting the output of the amplifier stage with the input of a further amplifier stage, said further amplifier stage including a further RC circuit connected between the output and the input of such further amplifier stage for accomplishing the integration function, and means operatively coupling the output of said further amplifier stage with said heating means whereby the heating means is controlled by the proportional, integral and derivative output signal issuing from the output of said further amplifier stage.

2. The rapid-response hot water delivery system according to claim 1 wherein said control means includes means operable to maintain the temperature of the water being discharged from said vessel substantially at said selected set point temperature regardless of the temperature of the water entering said vessel or the volumetric flow rate of water through said vessel.

3. The rapid-response hot water delivery system according to claim 1 wherein said demand-responsive means further includes reset-control means operable to move said predetermined temperature range with respect to said selected set point temperature when the temperature of the water being discharged from said vessel is within said predetermined range so as to cause the temperature of the water to approach said selected set point temperature.

4. The rapid-response hot water delivery system accordingly to claim 1 wherein said control means further includes alarm means operable to turn off said electrical heating means in response to a sensing of the temperature of the water being discharged from said vessel above a predetermined temperature value.

* * * * *